United States Patent Office 3,377,460
Patented Apr. 9, 1968

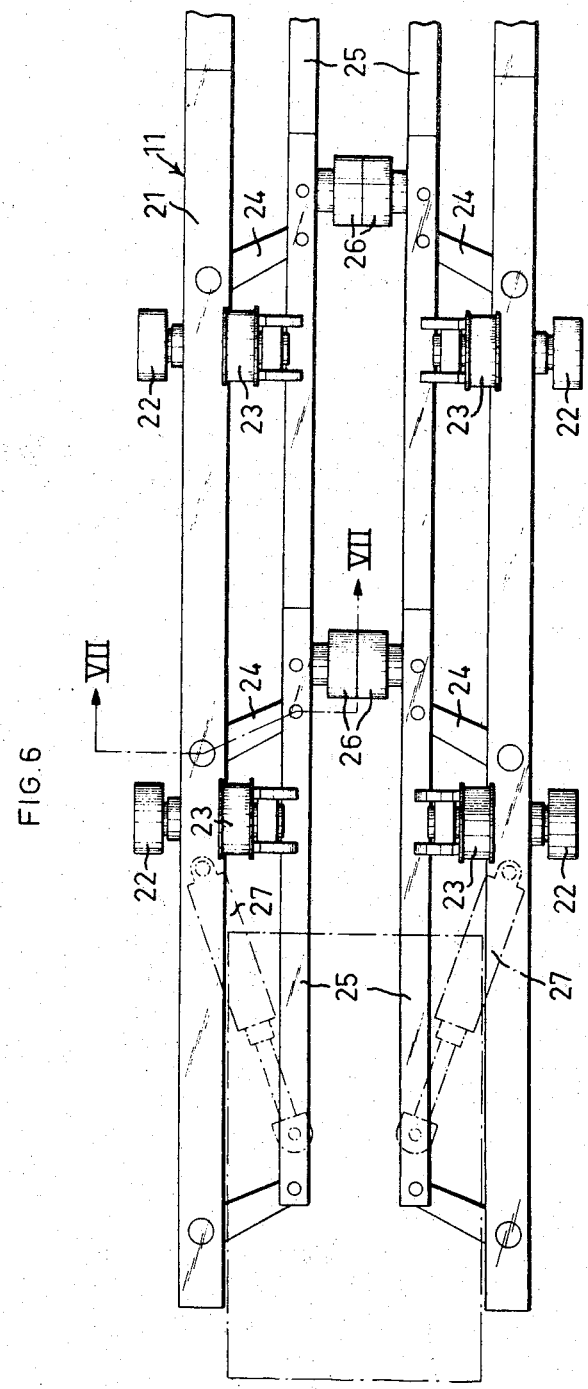

3,377,460
METHODS OF WELDING STIFFENING MEMBERS TO PLATES AND INSTALLATIONS THEREFOR
Harry Carl Axel Jonsson, Olafur Sigurdsson, and Eric Ragnar Hellstrom, Malmo, and Carl Eric Linnander, Goteborg, Sweden, assignors to Kockums Mekaniska Verkstads AB, Malmo-C, Sweden, a corporation of Sweden
Filed Jan. 25, 1965, Ser. No. 427,758
Claims priority, application Sweden, Jan. 31, 1964, 1,181/64
13 Claims. (Cl. 219—125)

This invention relates to a method of welding stiffening members to plates, and an installation therefor.

Planar stiffened sheeting or plate structures are required in several fields and particularly in ship building. Such sheeting or plate structures are used for bulkheads and decks and for shell plating in a great number of hull designs, particularly for tankers. Earlier, hulls were usually built in such a way that longitudinals and frames were raised in position at the site (in the stocks or the dock) whereupon plates were secured and welded to the longitudinals and frames at the site. The ship building technique, however, has taken such a development that ever larger sections of the hull are finished separately with plates, longitudinals, frames, and other component parts fixed to each other. The entire ship section is then placed in position at the site and is there connected to the other hull sections.

There have been made several attempts at rationalizing the building of such hull sections but not with very much success inter alia because only plates of a very restricted length could be produced and because no suitable mechanism for positioning stiffening members on the plates could be developed. In a prior-art device the stiffening members are thus placed on the plate and oriented with the aid of a plurality of manually operable screws, pressed against the plate by hydraulic apparatuses and secured to the plate by point welding, whereupon the plate is moved to another location for finishing the welding which takes place on a tiltable base. Such a method is extremely time-consuming and moreover the plate will be bent towards each stiffening member by reason of shrinking stresses in the welds so as to take a wavy appearance.

The object of the invention is to eliminate the drawback of the prior-art constructions of this type and to provide a method by which stiffening members can be welded in a very rapid and thus economically advantageous manner to a plate of optional length while the plate is maintained planar. The method suggested according to the invention is characterized by moving a plate of optional length by a plate conveyor into position in a welding station, supporting the plate along a line on which a stiffening member is to be welded thereto while the plate is pulled down on either side of said line to impart a bulging shape to the plate portion extending along said line, conveying the stiffening member to the plate by means holding the member in a suitable position for being welded to the plate and orienting said stiffening member along said line, pressing the stiffening member through pressure means against the plate, releasing the means conveying and orienting the stiffening member from its engagement with said stiffening member and returning the means to initial position, welding the stiffening member by welding apparatuses movable along it while said stiffening member is pressed against the plate by said pressure means, and releasing the pressure means, cancelling the force pulling down the plate and advancing the plate for welding another stiffening member thereto, whereupon the operating cycle is repeated.

For carrying out the method described above use is made according to the invention of an installation comprising a conveyor for conveying plates from a plate supply to a suitable position for welding, preferably a roller conveyor having drives acting in the longitudinal direction of the conveyor and connectible with the plates, and overhead travelling welding devices extending transversely of the conveyor, and welding apparatuses movable along said devices for welding the plates on said conveyor into plate sections of the desired length prior to their introduction into a welding station. This installation is characterized by means for conveying stiffening members from a supply to the welding station and orienting said members on the plate, means for biasing the plate at the places where stiffening members are to be welded thereto, pressure means such as hydraulic apparatuses for pressing the stiffening members against the plate, and welding apparatuses movable along said stiffening members.

These and further features of the invention will become apparent from the following description in which reference is made to the accompanying drawings illustrating an embodiment chosen by way of example.

In the drawings:

FIG. 6 is a view of a portion of a carriage movable on said track for conveying stiffening members to the welding station;

Figure 1:
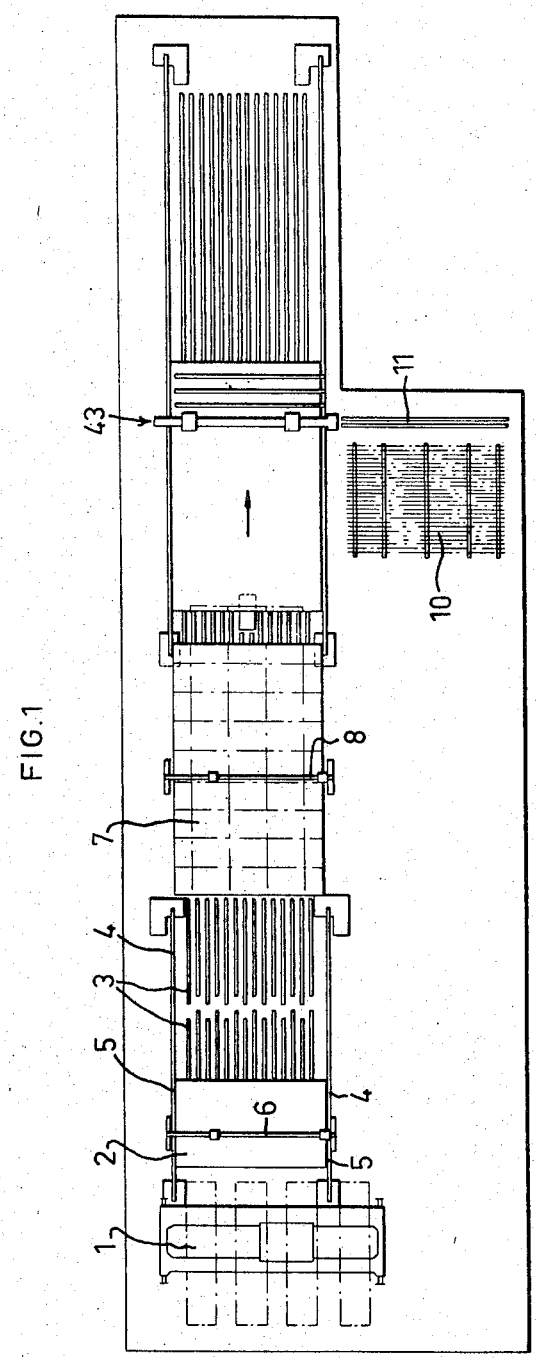
FIG. 1 is a diagrammatic top plan view of an installation according to the invention.

FIG. 1 diagrammatically illustrates an installation for the mechanized production of large frame-stiffened plates for the shell plating of a ship's hull. Planar plates intended for being welded together to form a large shell plating section are conveyed from a plate supply 1 to a station 2 on conveyor rollers 3. A conveying chain 4 runs on either side of the conveyor track formed by the conveyor rollers. The chains have gripping means for gripping the plates at each side edge 5 thereof. The plates are of rectangular shape with their longitudinal direction at right angles to the feed direction of the conveyor track. The plates are first placed so that the line formed by two abutting edges will extend directly beneath an overhead travelling welding device 6 longitudinally thereof. Said welding device includes a beam extending transversely across the plates and carrying one or more welding apparatuses movable longitudinally of the beam. After the plates have been correctly positioned in relation to the welding means welding of the plates is effected by moving the welding nozzles of the welding apparatuses along the line of the abutting plate ends. The welding apparatuses are thereby moved along the welding beam, the plates being welded from their top side. A number of plates are welded together in this way to form a suitably dimensioned section of the shell plating. This section is conveyed to a turn-over station where the welded plate section is turned through 180° by suitable means so that the underside of the plate section will be facing upwards. Welding of the underside of the plate joints is then performed by an overhead travelling welding device 8 in the same way as with the welding device 6. At the turning over of the sheet metal section the device 8 can be moved aside.

Figure 2:
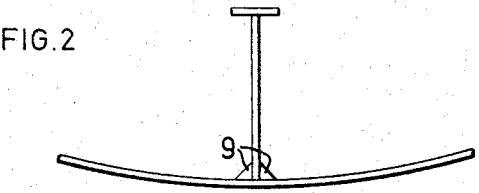
FIG. 2 is a view of a stiffening member fixed in the conventional manner to a plate by welding.
Figure 3:
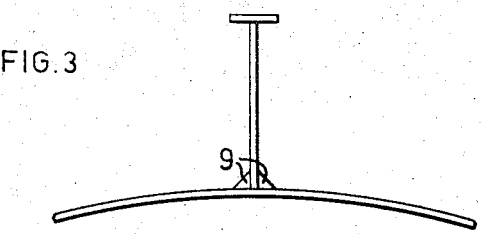
FIG. 3 is a view of a biased plate and the stiffening member fixed thereto.

After finished welding the plate section is conveyed to a welding station 43 in which stiffening members or frames, preferably in the form of T-profiles, are welded to the plate with the free web edge of the profile turned towards the plate. Means for biasing the plate are provided in the welding station 43 so that the plate will have imparted to it the shape shown in FIG. 3 along the line on which the frame is to be welded to the plate. Two essential advantages are obtained by this bias: on one hand buckles, if any, in the plate are removed, which occurs when the plate has imparted to it a single-curved shape with straight generatrix, and on the other hand the action of shrinking stresses is eliminated, which arise in the welds 9 securing the frame to the plate, and which, if no compensatory measures are taken, result in the plate being bent towards the frame in the manner shown in FIG. 2. The means for biasing the plate will be described more in detail in the following. The T-profile frame is conveyed to the welding station 43 from a supply 10 with the aid of means that will also be described more in detail in the following.

Figure 5:
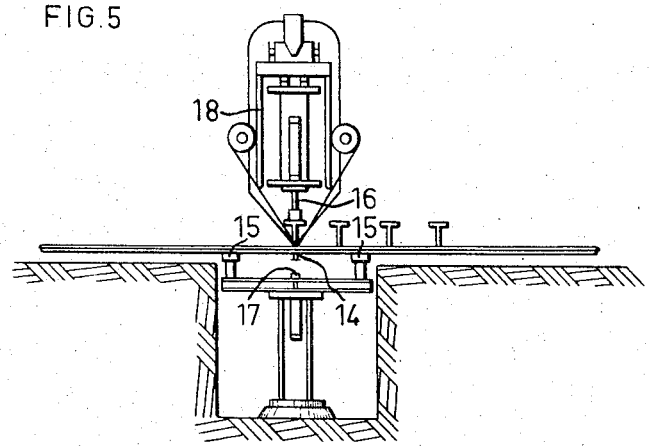
FIG. 5 is a section on line V—V in FIG. 4.
Figure 4:
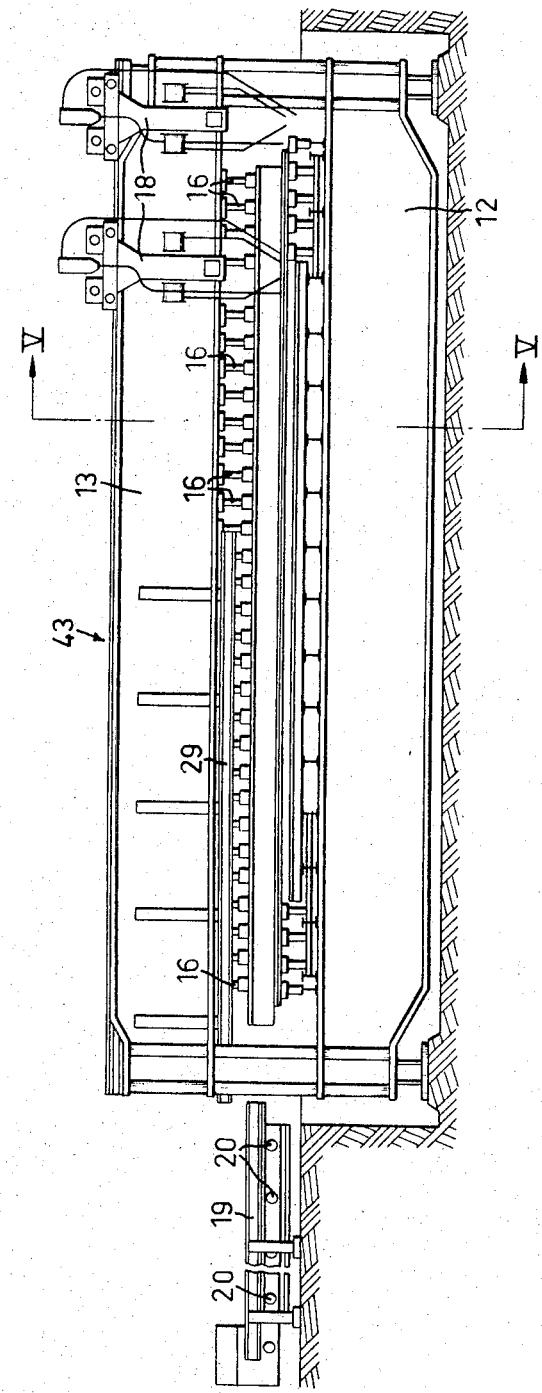
FIG. 4 is a view of a welding station where stiffening members are welded to plates, and a track on which stiffening members are conveyed to the welding station.
Figure 7:
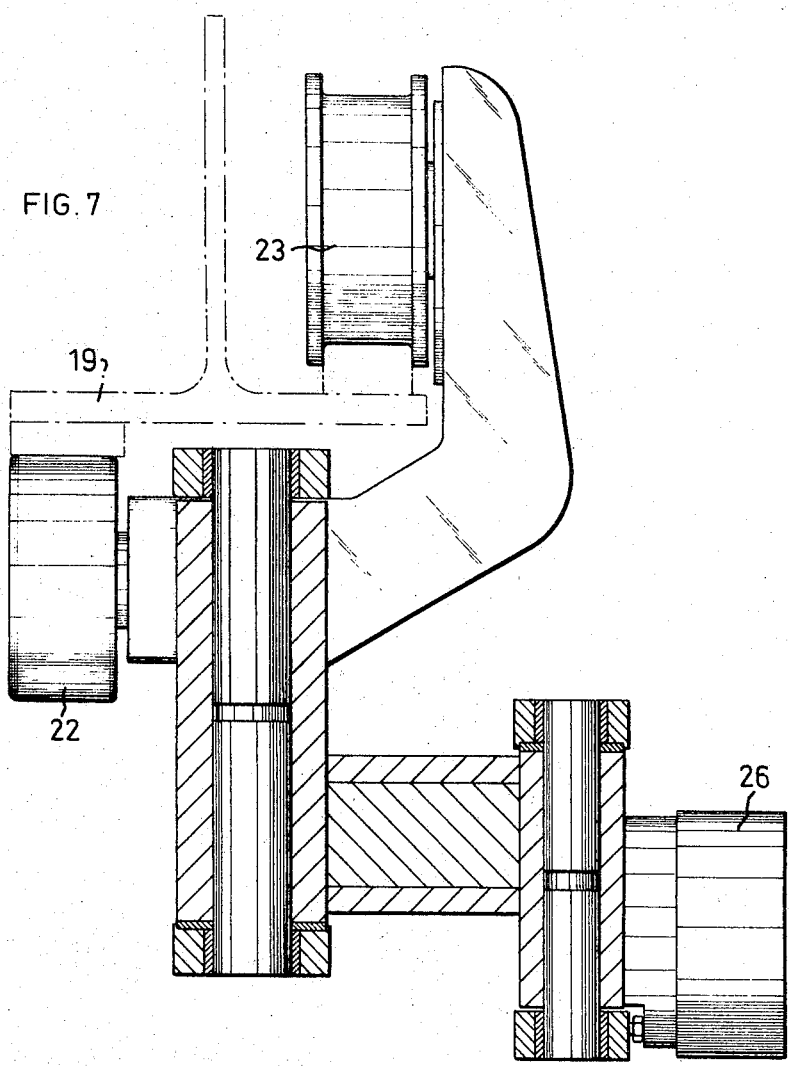
FIG. 7 is a section on line VII—VII in FIG. 6.
Figure 8:
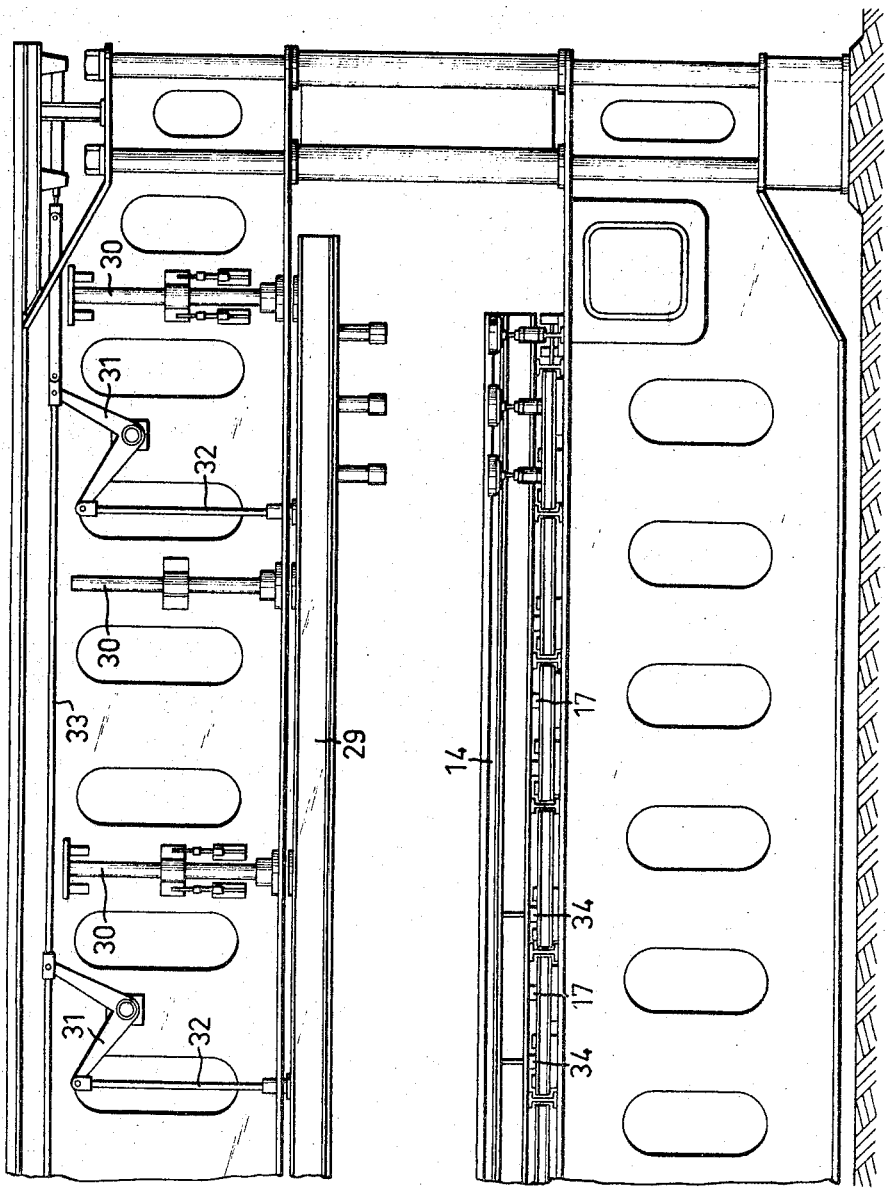
FIG. 8 is a view of a portion of the welding station.
Figure 9:
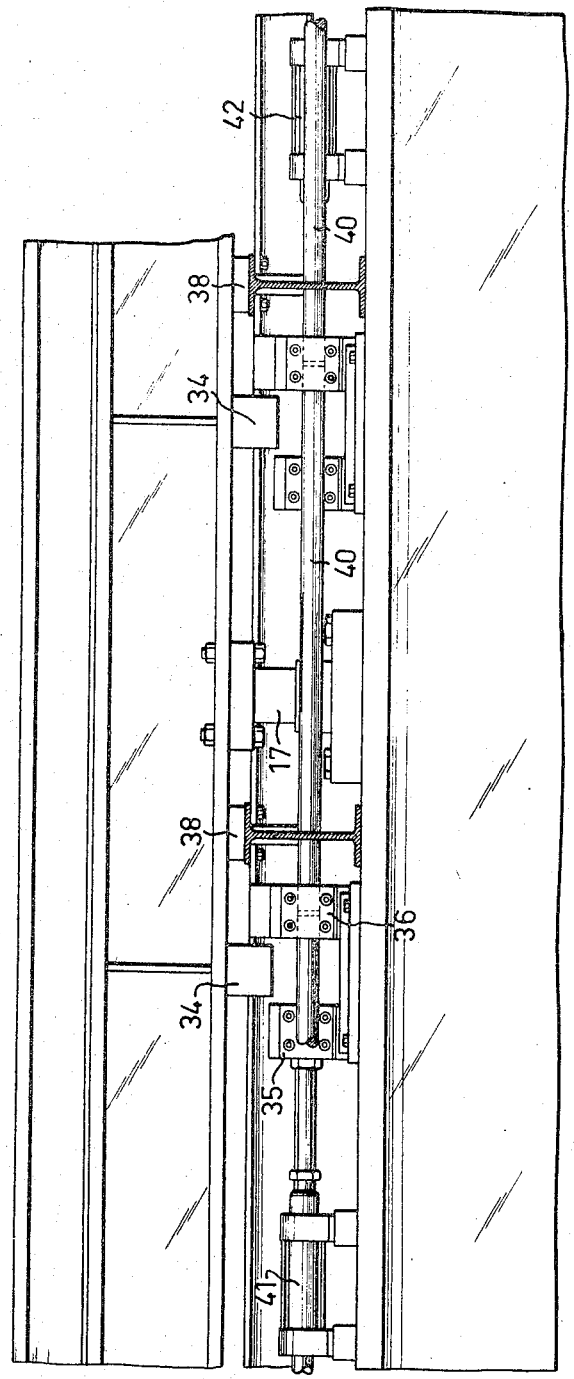
FIG. 9 is a view on a larger scale of part of the lower portion of the welding station as viewed in FIG. 8.
Figure 10:
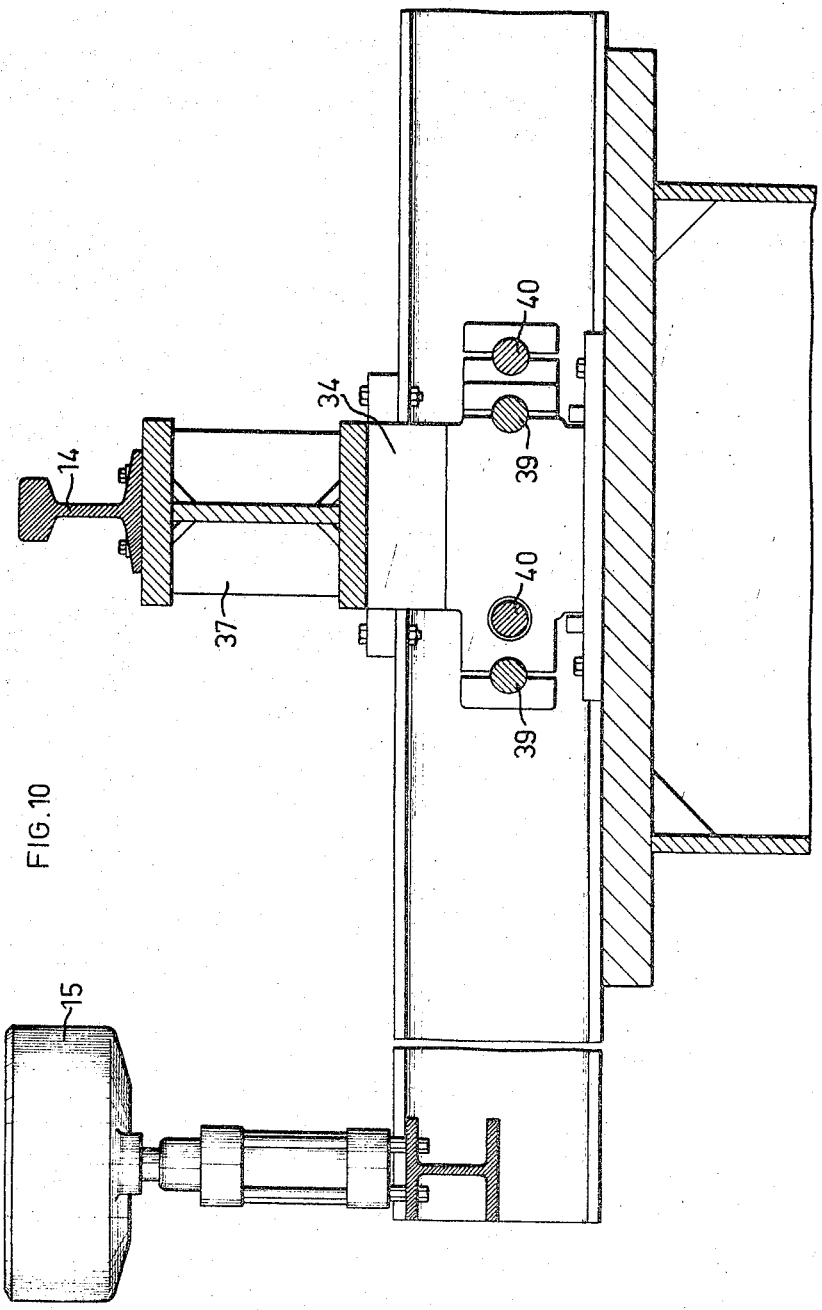
FIG. 10 is a view of a device for biasing the plate.

The welding station 43 consists of a lower fixed beam 12 and an upper fixed beam 13. The plate is introduced between these beams and rests on a supporting rail 14 (FIGS. 5 and 10) and a number of magnets 15 provided on either side of the supporting rail. At the insertion of the plate in the welding station 43 the supporting rail 14 and the magnets 15 are pulled down so as not to obstruct moving the plate. For realizing the desired preliminary bending the supporting rail 14 can be placed in different height positions in which it rests via abutments 34 at its underside on abutments 35, 36 provided beneath the rail at different levels, and the supporting rail 14 can be placed on said abutments with the aid of piston and cylinder units 17. The supporting rail 14 and an associated supporting beam 37 can be caused to rest either on an abutment 38 in the lowermost position or against one of the movable abutments 35 or 36. The abutments 35 are interconnected by means of two rods 39 while the abutments 36 are interconnected by means of two rods 40. Each set of abutments can thus move independently of the other set (FIG. 10), and the shifting thereof is realized by means of a piston and cylinder unit 42. For setting a slight preliminary bending the abutments 35 are inserted beneath the abutments 34 by means of the piston and cylinder unit 41 and the connecting rods 39 after the beam 14, 37 has been raised sufficiently with the aid of the piston and cylinder units 17. The beam is then lowered until the abutments 34, 35 bear against each other. In the same way the preliminary bending is increased with the aid of the abutments 34 and 36 as well as the connecting rods 40 and the piston and cylinder unit 42. For pulling down the plate, as earlier mentioned, on either side of the supporting rail 14 after the latter has been caused to take a suitable position the magnets 15 are mounted on piston and cylinder units so that the magnets 15 having been caused to attract the plate permit being moved downwardly to the desired extent, and it is readily seen that the height of the arc formed is dependent upon the difference in height between the height position of the rail 14 determined by said abutments and the lowermost position of the magnets. This makes it possible to realize the preliminary bending that is suitable in each particular case.

The device for conveying frames to the welding station 43 includes a carriage 11 which has rollers 22, 23 and is thus movable on two rails 19. Mounted on said carriage is a lever system comprising a number of levers 24 and connecting rods 25. On these connecting rods are mounted buffers 26 in the form of electromagnets. The lever system is operable by piston and cylinder units 27. At the reception of a frame the lever system is set in such a way that the magnet buffers will be spaced a sufficient distance apart, whereupon the frame is lowered from above for example by means of an overhead travelling device into position between said magnet buffers so that the web will be located therebetween and rest on rollers 27 provided between the rails. The magnet buffers are then moved together by the lever system clamping the web between them, with energization of the buffers. A drive engaging the rails 19 is adapted to move the carriage along said rails. As the drive can be of any suitable type whatever, it need not be described in detail here.

Rails 29 having the same profile as those earlier mentioned are arranged on the upper fixed beam 13 in the welding station 43 and serve to move frames into suitable position on the plate. The rails 29 are adapted to be lowered from their free position into a position opposite and connecting on to the earlier mentioned rails 19. For this purpose the rails 29 are guided by vertical guides 30. The vertical movement of the rails 29 is provided by a linkage 31, 32 and 33.

After the frame has been brought to take a suitable position on the plate with the aid of the carriage 11 and the rails 19 and 29, the operator energizes piston and cylinder units 16 regularly spaced apart on the upper fixed beam 13 to press the frame against the plate and to hold it in the desired position. As a result, by deenergizing and moving apart the magnet buffers the carriage can be released and returned to initial position whereupon the rails 29 can again be caused to take their upper free position. By pressing the frame against the plate the edge of the frame profile will always be in contact with the plate so that the frame will take the suitable position for welding. For it often happens that the plate is not fully planar or that the frame profile is not completely straight, these deviations being equalized by said pressure so that the plate and the profile are uniformly pressed against the supporting rail 14, giving a fully straight corner line (a line of intersection between the plane of the plate and the web plate plane of the frame profile). The lateral orientation of the frame has been realized by the magnet buffers 26 of the carriage so that the frame when pressed against the plate is in the desired vertical plane. The piston and cylinder units 16 are preferably individually operable so that pointwise occurring irregularities, if any, may be equalized by pressing the frame more firmly against the plate.

After the frame has been pressed against the plate it is welded thereto by continuous powder arc welding which is realized with the aid of welding apparatuses 18 movable along the upper beam 13 and which is preferably carried out in such a way that two welding apparatuses 18 each providing a weld on either side of the web plate of the frame are brought into central position on the beam and then moved in opposite directions under welding. After welding the plate, supporting rail 14 as well as the magnets 15 and the piston and cylinder units 16 return to their respective initial positions whereupon the plate is advanced one step corresponding to the distance between two stiffening frames. Then a new frame profile is inserted and the operation is repeated until the required number of frame profiles have been welded to the plate.

Summarizing, the welding of the frames to the plate is performed as follows. The plate is supplied and moved into position in the welding station 43. The frame profile is gripped by an overhead travelling device and placed in the carriage with the flange facing upwards. The buffers of the carriage are brought to bear against the web of the profile. The rails on the upper fixed beam in the welding station 43 are brought into working position, the supporting rail 14 is raised into desired position and caused to rest on abutments provided for this purpose. The magnets on either side of the supporting rail pull the plate downward to provide the desired preliminary bending. The carriage moves the frame profile into position for welding. The frame profile is pressed against the plate under suitable pressure by piston and cylinder units; if need be, the pressure of the piston and cylinder units is concentrated to certain points for equalization of bulges in the plate. The carriage releases the frame profile and returns to initial position. The rails on the upper beam are returned to their free position. The frame profile is welded to the plate by a double-sided weld with the aid of the welding apparatuses movable along the upper beam. The plate is advanced one step equal to the distance between two profiles. The method is repeated.

Of course, the invention must not be considered limited to the embodiment described and shown in the drawings but permits of being modified in several ways within the scope of the appended claims.

What we claim and desire to secure by Letters Patent is:

1. A method of welding stiffening members to plates which resides in the steps of positioning a plate of optional length by means of a plate conveyor in a welding station, supporting the plate along a line, on which a stiffening member is to be welded to the plate, while pulling down the plate on either side of said line to impart a bulging shape to the plate portion extending along the line, conveying the stiffening member to the plate and orienting it along said line by means holding the stiffening member in suitable position for being welded to the plate, pressing the stiffening member through pressure means against the plate, releasing the means conveying and orienting the stiffening member from its engagement with said member and returning said means to initial position, welding the stiffening member with the aid of welding apparatuses movable along said stiffening member while pressing said member against the plate through the pressure means and releasing the pressure means, cancelling the force pulling down the plate and advancing it for welding another stiffening member thereto, whereupon the operating cycle is repeated.

2. Installation for welding stiffening members to plates comprising a conveyor for conveying plates from a plate supply into suitable position for welding, overhead travelling welding devices extending transversely of the conveyor and welding apparatuses movable along said welding devices for welding plates on said conveyor into plate sections of desired length prior to their introduction into a welding station, means for conveying stiffening members from a supply to a welding station and orienting said stiffening members on the plate, means for biasing the plate at places where stiffening members are to be welded to the plate, pressure means for pressing the stiffening members against the plate and welding apparatuses movable along the stiffening members.

3. Installation for welding stiffening members to plates comprising a roller conveyor having drives acting in the longitudinal direction of the conveyor and connectible with the plates, overhead travelling welding devices extending transversely of the conveyor and welding apparatuses movable along said welding devices for welding plates on said conveyor into plate sections of desired length prior to their introduction into a welding station, means for conveying stiffening members from a supply to the welding station and orienting the stiffening members on the plate, means for biasing the plate at places where stiffening members are to be welded to the plate, hydraulic apparatuses for pressing stiffening members against the plate, and welding apparatuses movable along the stiffening members.

4. Installation for welding stiffening members to plates comprising a conveyor for conveying plates from a plate supply into suitable position for welding, overhead travelling welding devices extending transversely of the conveyor and welding apparatuses movable along said welding devices for welding plates on said conveyor into plate sections of desired length prior to their introduction in a welding station, means for conveying stiffening members from a supply to the welding station and orienting said stiffening members on the plate, a supporting rail on supporting means beneath the plate, means arranged on either side of the supporting rail and movable into engagement with the plate for bending, about the supporting rail, the portion extending along said supporting rail to provide bias of the plate at places where stiffening members are to be welded to the plate, pressure means for pressing stiffening members against the plate and welding apparatuses movable along the stiffening members.

5. Installation as claimed in claim 4, wherein the means movable into engagement with the plate are magnets disposed on the lower supporting means and movable each by means of a piston and cylinder unit at right angles to the plate.

6. Installation as claimed in claim 4 wherein the means movable into engagement with the plate are suction means disposed on the lower supporting means and movable each by means of a piston and cylinder unit at right angles to the plate.

7. Installation for welding stiffening members to plates comprising a conveyor for conveying plates from a plate supply into suitable position for welding, overhead travelling welding devices extending transversely of the conveyor and welding apparatuses movable along said welding devices for welding plates on the conveyor into plate sections of desired length prior to their introduction into a welding station, means for conveying stiffening members from a supply to the welding station and orienting the stiffening members on the plate, a supporting rail on supporting means beneath the plate, magnets disposed on either side of the supporting rail and movable into engagement with the plate and shiftable each through an individual piston and cylinder unit at right angles to the plate for bending, about the supporting rail, the portion of the plate extending along the supporting rail to provide bias of the plate at places where stiffening members are to be welded to the plate, means for adjusting said supporting rail into different height positions for increasing and decreasing the height of the arc formed at the bending of the plate about the supporting rail and thus of the bias of the plate, pressure means for pressing stiffening members against the plate, and welding means movable along the stiffening members.

8. Installation as claimed in claim 7 wherein said means for adjusting the supporting rail into different height positions include lugs provided at different levels and arranged beneath the rail and movable longitudinally thereof through piston and cylinder units, supports depending from the rail being adapted to rest on said lugs, and first and second hydraulic apparatuses for placing the supports on the different lugs, said first hydraulic apparatuses being adapted to shift the rail vertically and said second hydraulic apparatuses being adapted to move the lugs longitudinally of the rail.

9. Installation for welding stiffening members to plates comprising a conveyor for conveying plates from a plate supply into suitable position for welding, overhead travelling welding devices extending transversely of the conveyor and welding apparatuses movable along said welding devices for welding plates on the conveyor into plate sections of desired length prior to their introduction into a welding station, means for conveying stiffening members from a supply to the welding station and orienting the stiffening members on the plate, a supporting rail on supporting means beneath the plate, suction means disposed on either side of the supporting rail and movable into engagement with the plate and shiftable each through an individual piston and cylinder unit at right angles to the plate for bending, about the supporting rail, the portion of the plate extending along the supporting rail to provide bias of the plate at places where stiffening members are to be welded to the plate, means for adjusting said supporting rail into different height positions for increasing and decreasing the height of the arc formed at the bending of the plate about the supporting rail and thus of the bias of the plate, pressure means for pressing stiffening members against the plate, and welding means movable along the stiffening members.

10. Installation for welding stiffening members to plates comprising a conveyor for conveying plates from a plate supply into suitable position for welding, overhead travelling welding devices extending transversely of the conveyor and welding apparatuses movable along said welding devices for welding plates on said conveyor into plate sections of desired length prior to their introduction into a welding station, a supporting rail on supporting means beneath the plate, means on either side of the supporting rail and movable into engagement with the plate for bending, about the supporting rail, the portion of the plate extending along said supporting rail to provide bias of the plate at places where stiffening members are to be welded to the plate, pressure means for pressing stiffening members against the plate, welding apparatuses movable along the stiffening members, a carriage insertable betwen the pressure means and the plate and the lower supporting means, respectively, for conveying stiffening members from a supply to the welding station and orienting the stiffening members on the plate, said carriage being movable on rails and having buffers movable towards and away from each other in horizontal direction through hydraulic apparatuses and adapted to clamp a stiffening member between them.

11. Installation as claimed in claim 10 wherein the buffers are electromagnets which are energized when pressed against the stiffened member and deenergized when released therefrom.

12. Installation for welding stiffening members to plates comprising a conveyor for conveying plates from a plate supply into suitable position for welding, overhead travelling welding devices extending transversely of the conveyor and welding apparatuses movable along said welding devices for welding plates on said conveyor into plate sections of desired length prior to their introduction into a welding station, a supporting rail on supporting means beneath the plate, means on either side of the supporting rail movable into engagement with the plate for bending, about the supporting rail, the portion of the plate extending along said supporting rail to provide bias of the plate at places where stiffening members are to be welded to the plate, pressure means for pressing stiffening members against the plate, a carriage insertable between the pressure means and the plate and the lower supporting means, respectively, for conveying stiffening members from a supply to the welding station and orienting the stiffening members on the plate, said carriage having buffers movable towards and away from each other in horizontal direction through hydraulic apparatuses and adapted to clamp a stiffening member between them, welding apparatuses disposed on an overhead travelling welding device for movement along the stiffening members, and rollers arranged between the rails at right angles to the longitudinal direction of the rail for vertically supporting a stiffening member clamped between the buffers.

13. Installation for welding stiffening members to plates comprising a conveyor for conveying plates from a plate supply into suitable position for welding, overhead travelling welding devices extending transversely of the conveyor and welding apparatuses along said welding devices for welding plates on said conveyor into plate sections of desired length prior to their introduction into a welding station, a supporting rail on supporting means beneath the plate, means disposed on either side of the supporting rail and movable into engagement with the plate for bending, about the supporting rail, the portion of the plate extending along said supporting rail to provide bias of the plate at places where stiffening members are to be welded to the plate, pressure means for pressing stiffening members against the plate, an elongate carriage insertable between the pressure means and the plate and the lower supporting means, respectively, for conveying stiffening members from a supply to the welding station and orienting the stiffening members on the plate, said carriage being movable on rails and having buffers movable towards and away from each other in horizontal direction through hydraulic apparatuses and adapted to clamp a stiffening member between them, rails on upper supporting means carrying the pressure means for guiding the carriage between the pressure means and the lower supporting means, the profiles of said rails corresponding to those of the first-mentioned rails and said last-mentioned rails being movable through a linkage from released position into a position aligned with the first-mentioned rails and restorable into released position after the stiffening member has been pressed through the pressure means against the plate and the carriage has been returned to initial position, and welding apparatuses movable on said upper supporting means along the stiffening member.

References Cited

UNITED STATES PATENTS

| | | | |
|---|---|---|---|
| 3,154,665 | 10/1964 | Dunning et al. | 219—124 |
| 3,275,794 | 9/1966 | Dubusker et al. | 219—125 |
| 3,291,360 | 12/1966 | Linnander | 219—124 |
| 3,325,625 | 6/1967 | Ogden | 219—125 |

RICHARD M. WOOD, *Primary Examiner.*

W. D. BROOKS, *Assistant Examiner.*